United States Patent [19]

Saidman et al.

[11] Patent Number: 5,197,800
[45] Date of Patent: Mar. 30, 1993

[54] METHOD FOR FORMING COATING MATERIAL FORMULATIONS SUBSTANTIALLY COMPRISED OF A SATURATED RESIN RICH PHASE

[75] Inventors: Laurence B. Saidman, Avon Lake; James C. Smith, Amherst, both of Ohio

[73] Assignee: Nordson Corporation, Westlake, Ohio

[21] Appl. No.: 723,468

[22] Filed: Jun. 28, 1991

[51] Int. Cl.$^5$ .................. B01F 15/02; B67D 5/08; A62C 5/02
[52] U.S. Cl. ...................... 366/136; 222/1; 222/54; 222/64; 222/135; 222/144.5; 222/145; 239/8; 239/13; 137/3
[58] Field of Search ................ 366/136, 137, 131, 151, 366/153, 154, 159; 222/1, 54, 64, 135, 144.5, 145; 239/8, 13, 41; 137/3, 4, 5, 88, 372

[56] References Cited

U.S. PATENT DOCUMENTS

| | | |
|---|---|---|
| 1,483,225 | 2/1924 | Hammett . |
| 1,511,765 | 10/1924 | Latham . |
| 1,585,255 | 5/1926 | McFadden . |
| 3,025,464 | 3/1962 | Bond . |
| 3,133,437 | 5/1964 | Remke et al. . |
| 3,314,005 | 4/1967 | Whitener . |
| 3,751,644 | 8/1973 | Mayer . |
| 3,764,069 | 10/1973 | Runstadler, Jr. et al. . |
| 3,774,238 | 11/1973 | Hardway, Jr. . |
| 3,778,705 | 12/1973 | Maltby . |
| 3,933,285 | 1/1976 | Wiggins .......................... 222/190 |
| 4,059,466 | 11/1977 | Scholl et al. . |
| 4,059,714 | 11/1977 | Scholl et al. . |
| 4,156,754 | 5/1979 | Cobbs, Jr. et al. . |
| 4,174,498 | 11/1979 | Preikschat . |
| 4,181,881 | 1/1980 | Preikschat . |
| 4,193,745 | 3/1980 | Hamilton et al. . |
| 4,200,207 | 4/1980 | Akers et al. . |
| 4,247,581 | 1/1981 | Cobbs, Jr. et al. . |
| 4,259,402 | 3/1981 | Cobbs, Jr. et al. . |
| 4,288,741 | 9/1981 | Dechene et al. . |
| 4,301,119 | 11/1981 | Cobbs, Jr. et al. . |

(List continued on next page.)

FOREIGN PATENT DOCUMENTS

| | | |
|---|---|---|
| 0733732 | 5/1966 | Canada . |
| 0743666 | 9/1966 | Canada . |
| 0246797 | 11/1987 | European Pat. Off. . |
| 0259689 | 3/1988 | European Pat. Off. . |
| 0350909 | 1/1990 | European Pat. Off. . |
| 0350910 | 1/1990 | European Pat. Off. . |
| 0388915 | 9/1990 | European Pat. Off. . |
| 0388916 | 9/1990 | European Pat. Off. . |
| 0388923 | 9/1990 | European Pat. Off. . |

*Primary Examiner*—Robert W. Jenkins
*Attorney, Agent, or Firm*—Ruden, Barnett, McClosky, Smith, Schuster & Russell

[57] ABSTRACT

A method and apparatus for forming and dispensing a coating material formulation containing a liquid coating composition and a supercritical fluid as a diluent comprises a closed vessel having a hollow interior; a system for supplying fluid diluent into the vessel interior and for transforming the fluid diluent into supercritical fluid within the vessel; and, a system for introducing liquid coating composition into the vessel interior in such a way that it is sufficiently exposed to the supercritical fluid to form a fluid diluent rich phase and a liquid coating composition or resin rich phase which is saturated with supercritical fluid up to or near its saturation point for the temperature and pressure conditions within the vessel. The resin rich phase has a higher density than the fluid diluent rich phase and therefore collects on the bottom of the vessel from where it is withdrawn and supplied to coating dispensers for deposition on a substrate. The coating material formulation which is not discharged from the dispensers is preferably recirculated back into the closed vessel in such a way that it is permitted to absorb sufficient supercritical fluid to return to the saturation point.

39 Claims, 6 Drawing Sheets

U.S. PATENT DOCUMENTS

| | | |
|---|---|---|
| 4,371,096 | 2/1983 | Scholl et al. . |
| 4,405,063 | 9/1983 | Wydro et al. . |
| 4,407,431 | 10/1983 | Hutter ................................... 222/1 |
| 4,423,161 | 12/1983 | Cobbs, Jr. et al. . |
| 4,505,406 | 3/1985 | Cobbs, Jr. et al. . |
| 4,505,957 | 3/1985 | Cobbs, Jr. et al. . |
| 4,527,712 | 7/1985 | Cobbs, Jr. et al. . |
| 4,553,701 | 11/1985 | Rehman et al. . |
| 4,601,645 | 7/1986 | Schmitkons . |
| 4,630,774 | 12/1986 | Rehman et al. . |
| 4,632,314 | 12/1986 | Smith et al. . |
| 4,654,802 | 3/1987 | Davis . |
| 4,774,680 | 9/1988 | Agar . |
| 4,778,631 | 10/1988 | Cobbs, Jr. et al. . |
| 4,779,762 | 10/1988 | Klein et al. . |
| 4,809,129 | 2/1989 | Hansen, III et al. . |
| 4,882,107 | 11/1989 | Cavender et al. . |
| 4,912,381 | 3/1990 | Culberson . |
| 4,923,720 | 5/1990 | Lee et al. . |
| 4,939,468 | 7/1990 | Takeuchi . |
| 5,009,367 | 4/1991 | Nielsen . |
| 5,027,742 | 7/1991 | Lee et al. . |
| 5,057,342 | 10/1991 | Hoy et al. . |

METHOD FOR FORMING COATING MATERIAL FORMULATIONS SUBSTANTIALLY COMPRISED OF A SATURATED RESIN RICH PHASE

RELATED APPLICATIONS

This application is related to U.S. patent application Ser. No. 07/662,401, filed Feb. 27, 1991 and entitled "Method and Apparatus For Forming And Dispensing Single and Multiple Phase Coating Material Containing Fluid Diluent", now abandoned, and U.S. patent application Ser. No. 07/728,051, filed Jul. 15, 1991, entitled "Method and Apparatus for Forming and Dispensing Single and Multiple Phase Coating Material Containing Fluid Diluent," both of which are owned by the assignee of this invention and which are expressly incorporated herein by reference.

FIELD OF THE INVENTION

This invention relates to coating systems, and, more particularly, to a method and apparatus for combining a liquid coating composition with a supercritical fluid as a diluent, within a closed vessel, to produce a coating material solution or formulation consisting essentially entirely of a substantially saturated liquid coating composition or resin rich phase, having a predetermined proportion of liquid coating composition to supercritical fluid for given temperature and pressure conditions, which is transmitted to one or more coating dispensers for deposition on a substrate.

BACKGROUND OF THE INVENTION

A major problem of the coating and finishing industry, both in terms of raw material usage and in environmental effects, concerns the solvent components of paint. In a spray coating application of a resinous material, the resinous material is typically dissolved in an organic solvent provided with a viscosity suitable for spraying. This is required because it has been found that at each stage of the process for atomizing and conveying a resinous material in liquid form to a substrate, the liquid resists high speed deformation. Organic solvents are added to the resinous liquid because they have the effect of separating the molecules of resinous material and facilitating their relative movement making the solution more deformable at high speeds and therefore more susceptible to atomization. Substantial effort has been expended to reduce the volume of liquid solvent components in preparing high solids coating compositions containing about 50 percent by volume of polymeric and pigmentary solids. Nevertheless, most high solids coating compositions still contain from 15 to 40 percent by volume of liquid solvent components.

The problem with such a high volume content of liquid solvents in coating compositions is that during handling, atomization or deposition of the coating compositions, the solvents escape and can become air contaminants if not properly trapped. Once the coating composition is applied to a substrate, its solvents escape from the film by evaporation and such evaporated solvents can also contaminate the surrounding atmosphere. Additionally, since most solvents react with oxidants, pollution problems of toxicity, odor and smog may be created. Attempts at overcoming such environmental problems have proven to be costly and relatively inefficient.

It has previously been proposed in Cobbs U.S. Pat. No. 4,247,581 to reduce solvent content in paint by mixing a liquid or gas blowing agent into the paint to produce an easily atomized foam solution just upstream from the discharge outlet of a dispensing device. Rehman et al U.S. Pat. No. 4,630,774 disclosed an improvement of this concept wherein a foaming chamber and turbulence inducing device was incorporated into the coating dispenser to better control the formation of the foam prior to discharge from the outlet of the dispenser. U.S. Pat. Nos. 4,505,406; 4,505,957; and, 4,527,712 also disclose methods and/or apparatus for mixing liquid or gas blowing agents into paint formulations to reduce solvent content. Each of these patents are owned by the assignee of this invention.

More recently, U.S. Pat. No. 4,923,720 to Lee et al disclosed a method and apparatus for the continuous production of a coating material formulation in which a substantial amount of the liquid solvent component is removed and replaced with a supercritical fluid such as supercritical carbon dioxide which functions as a diluent to enhance the application characteristics of the coating material formulation. The supercritical carbon dioxide and some liquid solvent material, e.g., about two thirds less than is required in other coating compositions, are intermixed with polymeric and pigmentary solids to form a coating material solution or formulation having a viscosity which facilitates atomization through an airless coating dispenser. As the coating material formulation is discharged from the dispensing device(s) toward a substrate, the supercritical carbon dioxide "flashes off" or vaporizes to assist in atomization of the high solids coating composition and to reduce drying time of the composition on a substrate. This type of coating material formulation, and those types of foamable formulations described above, have the advantage of substantially reducing the adverse environmental affects caused by high solvent content.

It has been observed that in order to produce a coating material solution or formulation with the desired application characteristics, the relative proportion of the liquid coating composition and supercritical fluid should be maintained at a predetermined ratio or within a predetermined range. This produces a formulation which is either "single phase" or "multiple phase". A formulation is considered in single phase when the supercritical fluid is dissolved or dispersed within the liquid coating composition forming a single continuous phase of material having a given composition and density. A formulation is considered to be multiple phase when two or more phases of material are present, each having a different composition and density. A single phase formulation can be converted to a two phase formulation by adding more supercritical fluid, or by reducing system pressure, so that the first phase is generally continuous and the second phase is typically a "dispersed" phase or one having bubbles dispersed in the first phase.

One problem with systems of the type disclosed in the Lee et al U.S. Pat. No. 4,923,720, which are designed for the continuous production of a coating material formulation, is an inability in some instances to control and/or maintain the relative proportion of liquid coating composition and supercritical fluid so that either a single phase or a multiple phase formulation is formed for transmission to coating dispensers. The ineffectiveness of the Lee et al system in this respect can be attributed to the pumping system it employs for supplying the liquid coating composition and/or supercritical fluid to the coating dispensers, and to the loss of supercritical fluid within the system caused by leakage, uneven mixing and the like. No provision is made in the Lee et al system for monitoring the liquid coating composition and/or supercritical fluid content within the system, nor are there any means for selectively altering the volume of either of these components in the course of the system operation.

Many of these problems are also present in an alternative, batch-type system disclosed in U.S. Pat. No. 5,009,367 to Nielsen, which is owned by the same assignee as the Lee et al Pat. No. 4,923,720. As shown in FIG. 6 of the Nielsen patent, the liquid coating composition and supercritical fluid are each weighed prior to introduction to the system, in predetermined proportions, and then introduced into a loop where they are intermixed within a static mixer in preparation for transmission to coating dispensers. This weighing procedure is cumbersome, and, like the Lee et al system, no provision is made in the Nielsen apparatus for adjusting the relative proportion of liquid coating composition and supercritical fluid once the system begins to operate.

U.S. patent application Ser. No. 07/662,401, filed Feb. 27, 1991, and U.S. patent application Ser. No. 07/728,051, both entitled "Method and Apparatus For Forming And Dispensing Single and Multiple Phase Coating Material Containing Fluid Diluent", which are owned by the assignee of this invention, has addressed problems presented with systems of the type disclosed in the Lee et al U.S. Pat. No. 4,923,720 and Nielsen U.S. Pat. No. 5,009,367. The method and apparatus disclosed in application Ser. Nos. 07/662,401 and 07/728,051 includes a control system which is effective to adjust the supply of supercritical fluid and/or liquid coating composition in accordance with variations in a sensed parameter, such as capacitance of the coating material formulation, in order to (1) maintain the coating material formulation in substantially single phase or in substantially multiple phase, as desired, in the course of an operating run; and, (2) to ensure that the desired ratio of liquid coating composition to supercritical fluid is obtained before the formulation is supplied to coating dispensers for deposition onto a substrate. The control system disclosed in application Ser. Nos. 07/662,401 and 07/728,051 is highly effective in forming and maintaining a coating material formulation having the desired supercritical fluid and liquid coating composition content, and provides substantial flexibility in accommodating different types of liquid coating compositions and different application characteristics on a given substrate.

One potential limitation of the of system of Ser. Nos. 07/662,401, and 07/728,051 however, are that they provide more control capability than may be required for certain applications. There has therefore been a need for a simpler, less expensive system of forming coating material formulations of the type described above for certain applications. A second limitation of this system is that it is relatively time consuming to clean in the event a change of color of the formulation is desired, and thus may not be readily adaptable or practically usable for multiple color applications.

SUMMARY OF THE INVENTION

It is therefore among the objectives of this invention to provide a method and apparatus for forming a coating material solution or formulation containing a liquid coating composition and supercritical fluid as a diluent, which reasonably accurately maintains the relative proportion of liquid coating composition and supercritical fluid during an operating run, which is relatively simple to operate, which is relatively inexpensive, and which permits the use of different color coating material formulations in multicolor applications.

These objectives are accomplished in a method and apparatus for forming and dispensing a liquid coating formulation comprised of a liquid coating composition and a supercritical fluid wherein the liquid coating composition is sufficiently exposed to supercritical fluid within the interior of a closed vessel to permit the liquid coating composition to absorb the supercritical fluid up to its saturation point, at predetermined temperature and pressure conditions within the vessel, to produce a liquid coating composition rich phase which approaches or is at the equilibrium condition for the vessel conditions. This liquid coating composition rich phase, also known as the "resin rich phase", falls under the influence of gravity to the bottom of the vessel where it collects, and the remainder of the vessel, after the initial introduction of liquid coating composition, contains a fluid diluent rich phase. A coating material formulation, consisting substantially entirely of the resin rich phase, is then delivered to a coating dispenser for deposition onto a substrate, or, alternatively, is recirculated back into the closed vessel for reuse. As will later be explained in more detail, it has been observed that coating material formulations comprised substantially entirely of a saturated resin rich phase often have good application characteristics when dispensed. Thus, easily and reliably producing such a formulation is desirable.

One aspect of this invention is predicated upon the concept of obtaining reliable control of the relative proportion of liquid coating composition and supercritical fluid forming the coating material formulation with a comparatively simple control system. In the presently preferred embodiment, means are provided for supplying liquid fluid diluent to the closed vessel, which is heated, including a supply tank containing the fluid diluent, a pump and a fluid pressure regulator interposed between the pump and the closed vessel. The fluid pressure regulator is set at a predetermined optimal pressure setting, determined experimentally during one system calibration procedure described below where the vessel pressure is varied while vessel temperature remains fixed, and this preferred pressure setting controls the pressure within the vessel. In an alternative system calibration procedure, the vessel temperature is varied, with the pressure being held constant, to arrive at a predetermined optimal temperature setting.

The fluid pressure regulator controls the flow of fluid diluent from the supply tank and pump into the pressure vessel by permitting the passage of fluid diluent therethrough only in the event the pressure within the closed vessel falls below the predetermined level. The pressure regulator stalls the pump, and thus prevents the passage of fluid diluent therethrough, when the pressure within the closed vessel is at or above the predetermined level. As a result, fluid diluent is admitted into the closed vessel only as necessary to maintain the desired pressure therein. The fluid diluent is supplied to the vessel at a pressure above its critical pressure. Once in the vessel, the fluid diluent is heated above its critical temperature to become a supercritical fluid. The supercritical fluid within the vessel is dissolved within a particular liquid coating composition introduced into the vessel up to its saturation point to obtain a coating material formulation at the bottom of the vessel which is comprised substantially entirely of a saturated resin rich phase.

The flow of liquid coating composition into the closed vessel is controlled with another relatively simple, yet reliable, control mechanism. In the presently preferred embodiment, means are provided for supplying liquid coating composition to the closed vessel including a container of liquid coating composition, a piston pump and a pair of flow switches each connected to a three-way valve. The three-way valves, in turn, are connected by supply lines to the closed vessel and by a control line to a level detector mounted to the closed vessel. This level detector is effective to sense the level of coating material formulation within the closed vessel in the course of a production run. The level detector sends a signal to the three-way valves to either open or close the flow of liquid coating composition to the closed vessel depending upon a predetermined, desired level of coating material formulation therein. The supply of liquid coating composition to the closed vessel is therefore dependent on the fluid level within the pressure vessel, whereas the supply of fluid diluent is dependent upon the pressure within the vessel. Since pressure and level control techniques are well developed and relatively inexpensive, the supercritical fluid saturated, resin rich phase can be reliably produced for delivery to one or more dispensing devices in a relatively simple and inexpensive way as compared to the other techniques.

A key aspect of this invention is the provision of structure for adequately exposing the liquid coating composition to supercritical fluid within the interior of the closed vessel to produce a liquid coating composition rich or resin rich phase wherein supercritical fluid is dissolved within the liquid coating composition up to its saturation point for the temperature and pressure conditions within the vessel. In one presently preferred embodiment, adequate exposure of the liquid coating composition to the supercritical fluid is achieved using one or more atomizing spray nozzles, preferably located at the top of the vessel interior, which receive liquid coating composition from the three-way valves described above. The liquid coating composition is discharged in atomized droplets from the nozzles through a head or space of the fluid diluent rich phase, or supercritical carbon dioxide rich phase, located between the nozzles and the surface of the resin rich phase which is present at the bottom of the vessel. In the course of passage from the spray nozzles through the fluid diluent rich phase, the atomized droplets of liquid coating composition become substantially saturated with supercritical fluid thus forming more resin rich phase which is added to the body of resin rich phase present at the bottom of the vessel. Preferably, the resin rich phase which is withdrawn from the closed vessel but not discharged through the coating dispensers associated with the system is recirculated into the closed vessel at a location within the head or space of fluid diluent rich phase. Such recirculated formulation is thus re-exposed to additional supercritical fluid which may be dissolved therein as needed.

In an alternative embodiment particularly adapted for high viscosity liquid coating compositions, sufficient exposure of the liquid coating composition to the supercritical fluid is achieved by a series of baffle plates which are provided within a baffle tube. The baffle tube is connected between the supply means for the liquid coating composition and the lower portion of the vessel. Virgin liquid coating composition is introduced at the top of the baffle tube which is filled with fluid diluent rich phase from the vessel interior. The virgin liquid coating composition is exposed to supercritical fluid by the baffle plates within the baffle tube to achieve saturation of the liquid coating composition up to its saturation or equilibrium point for the temperature and pressure conditions within the vessel. The saturated, resin rich phase thereby produced is collected on the bottom of the vessel for transmission to the coating dispensers as the coating material formulation. In the event coating material formulation is recirculated from the dispensers back to the closed vessel, a static mixer is preferably provided upstream from the baffle tube wherein the recirculated formulation and virgin liquid coating composition are initially combined and mixed prior to introduction into the baffle tube and vessel. The static mixer combines virgin liquid coating composition and the recirculated coating material formulation to at least partially reduce the viscosity of the virgin liquid coating composition in preparation for exposure to supercritical fluid within the baffle tube.

One surprising finding of the applicants has been that adequate exposure of the liquid coating compositions, which have so far been tested, to supercritical fluid has been achieved using the atomization nozzle embodiment, and there has not yet been a need to employ the baffle tube embodiment. It is believed that even the higher viscosity coating material compositions are more easily atomized in the supercritical carbon dioxide environment inside the vessel than they would be in air, for example. Thus, it may be possible to use the spray nozzle embodiment to achieve adequate atomization and therefore adequate surface contact between the liquid coating composition particles and the supercritical fluid even with the higher viscosity liquid coating compositions.

In addition to the relatively reliable and inexpensive material supply controls described above, another important advantage of this invention involves its versatility in accommodating liquid coating compositions of different color. The apparatus herein is essentially modular in construction in that a number of individual vessels can be provided, each connected to a separate source of liquid coating composition having a different color. In this embodiment, the output line from each individual vessel is connected to a color change manifold of the type disclosed, for example, in U.S. Pat. Nos. 4,627,465 and 4,657,047 owned by the assignee of this invention. The color change manifold supplies the coating material formulation of a given color from one of the vessels to the coating dispensers for application on a substrate. To change colors, the color changer and liquid coating composition line to the dispenser are flushed and cleaned so that another color of coating material formulation can be supplied to the same dispensers with minimal downtime. This is advantageous in applications wherein a number of different colors must be utilized with the same spraying system.

DESCRIPTION OF THE DRAWINGS

The structure, operation and advantages of the presently preferred embodiments of this invention will become further apparent upon consideration of the following description, taken in conjunction with the accompanying drawings, wherein.

DETAILED DESCRIPTION OF THE INVENTION

Figure 1:
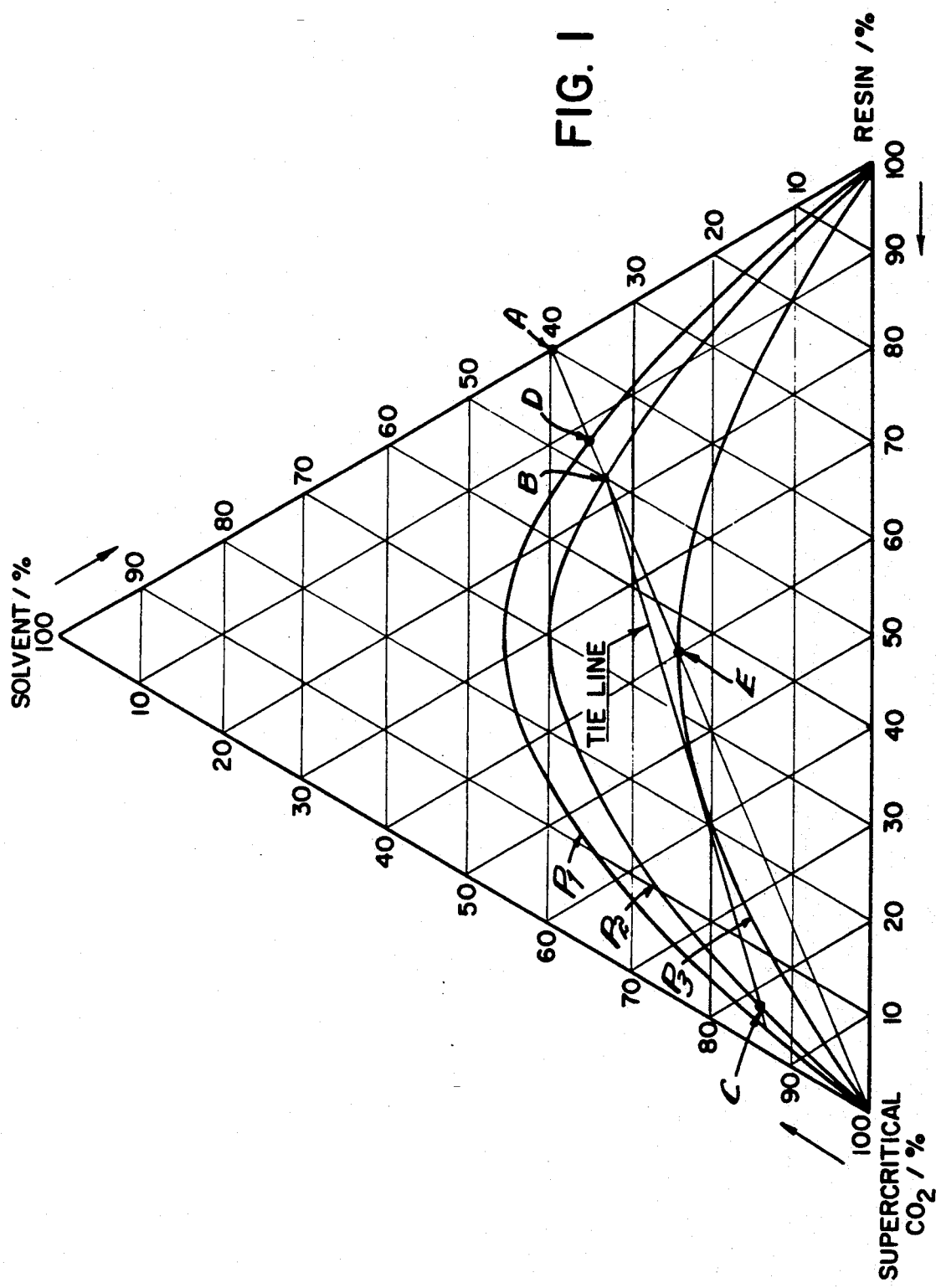
FIG. 1 is a phase diagram showing the two phase boundaries of a coating material formulation at given temperature for three different pressures, in a hypothetical coating material formulation comprised of a liquid coating composition formed of a resin and solvent, combined with supercritical carbon dioxide as the fluid diluent.

The method and apparatus of this invention, and the various embodiments disclosed herein, are specifically intended to form a coating material solution or formulation in which a liquid coating composition and a supercritical fluid are combined within a closed vessel to form a liquid coating material solution or formulation for transmission to one or more dispensers for deposition onto a substrate (not shown). A number of terms are used in the following discussion to explain the method or process of this invention, and these terms are defined as follows.

A "liquid coating composition" refers to materials such as paints, waxed base materials such as mold release agents, adhesives and other materials which include a solvent component and one or more components to be sprayed, applied or dispersed wherein a portion of the solvent component is replaced with a fluid diluent such as supercritical fluid in order to reduce solvent emissions. "Liquid coating compositions", as that term is applied to paints herein, is meant to refer to a mixture of solvent and "resin", e.g., pigments and other solids which are commonly found in commercially available paints.

The term "supercritical fluid" as used herein is intended to refer to a gas in a supercritical state above its critical pressure and critical temperature. The term "liquified gas" refers to a gas in liquid state, which, when exposed to appropriate temperature and pressure, is capable of forming a supercritical fluid. The term "fluid diluent" as used herein refers to both supercritical fluids and liquified gases. The terms "coating material solution" and/or "coating material formulation" are used synonymously to refer to the combination of the fluid diluent or supercritical fluid and the liquid coating composition wherein the fluid diluent or supercritical fluid is substantially dissolved in the liquid coating composition to form a solution or at least an emulsion or dispersion.

As described below in connection with an explanation of the process of this invention, the coating material formulation is produced by combining a liquid coating composition with a supercritical fluid or fluid diluent within a closed vessel. In the course of combining these materials, two distinct "phases" are produced at different locations within the vessel. One "phase" which is formed will be referred to herein as the "resin rich phase" or "liquid coating composition rich phase", and a second phase will be called the "fluid diluent rich phase" or "supercritical carbon dioxide rich phase". The terms "resin rich phase" and "liquid coating composition rich phase" are used synonymously to refer to a combination of supercritical fluid and liquid coating composition, i.e., resin and solvent, in which there is a relatively large percentage or proportion of resin and solvent compared to supercritical fluid. In this resin rich phase, the supercritical fluid is substantially dissolved or dispersed within the liquid coating composition. The terms "fluid diluent rich phase" and "supercritical carbon dioxide rich phase" are used synonymously to refer to a combination of supercritical fluid and liquid coating composition (resin and solvent) in which there is a relatively large percentage of supercritical fluid and a comparatively small amount of resin and solvent. Because both the resin rich phase and fluid diluent rich phase contain a combination of supercritical fluid, resin and solvent, in equilibrium with one another, each of such "phases" is technically considered a "coating material formulation" as that term is used herein. As discussed in detail below, a coating material formulation is removed from the vessel and supplied to one or more coating dispensers which consists substantially entirely of the resin rich phase because it is the resin rich phase, with its comparatively high proportion of resin, which is useful in forming an acceptable coating upon a substrate.

The term "phase" is also used in another sense in the following description to explain the process of this invention. As described in detail below, exposure of the liquid coating composition to supercritical fluid within the closed vessel at predetermined pressure and temperature conditions results in the formation of a "saturated" resin rich phase. A saturated, resin rich phase refers to a condition wherein the liquid coating composition has absorbed all of the supercritical fluid it can, at given temperature and pressure conditions, while remaining in a "continuous or single phase" having a given composition and density. The term "single phase" in this context is meant to refer to a saturated state of the resin rich phase wherein the supercritical fluid, and liquid coating composition (i.e., resin and solvent), are in equilibrium with one another and are essentially continuous with no other material present. Depending upon pressure and temperature conditions within the vessel, a "two phase" condition can exist wherein at least some fluid diluent rich phase (i.e., a combination, in equilibrium, of primarily supercritical fluid with some resin and solvent) is dispensed within the resin rich phase (i.e., a combination, in equilibrium, of primarily resin and solvent with some supercritical fluid). Reference to "single phase" and "two phase" in this context is therefore concerned with the state of the resin rich phase which is drawn from the bottom of the vessel for delivery to the dispenser. As discussed below, the resin rich phase is denser than the fluid diluent rich phase because of the higher proportion of resin and solvent therein, and thus the resin rich phase naturally falls under the influence of gravity to the bottom of the vessel whereas the fluid diluent rich phase occupies the volume of the vessel above the level of the resin rich phase.

A "coating dispenser" as used herein, at least in painting applications, refers to an airless-type spray gun capable of handling the fluid pressures employed in the method and apparatus of this invention. Preferably, the dispensers are airless spray guns of the type disclosed in co-pending U.S. Pat. No. 5,088,443, entitled "Method and Apparatus for Spraying a Liquid Coating Containing Supercritical Fluid or Liquified Gas," issued on Feb. 8, 1992, the disclosure of which is incorporated by reference in its entirety herein. Alternatively, air assisted airless-type spray guns can be used with the apparatus 10 of this invention such as are shown in U.S. Pat. No. 3,843,052 to Cowan.

The purpose of the supercritical fluid is to act as a diluent for the coating composition so that the proportion or percentage of organic solids in the liquid coating composition can be reduced, e.g., by about two-thirds, compared, for example, to most commercially available high solids liquid coating compositions such as paint. A number of compounds in a supercritical state can be intermixed with a liquid coating composition, such as paint, to produce the coating material solution or formulation obtained by the means of the method and apparatus of this invention. These compounds include carbon dioxide, ammonia, water, nitrogen oxide ($N_2O$), methane, ethane, ethylene, propane, pentane, methanol, ethanol, isopropanol, isobutanol, chlorotrifluoromethane, monofluoromethane, and others. For purposes of the present discussion, supercritical carbon dioxide is employed because of its non-toxic nature and because its critical temperature and critical pressure of 85° F. and 1070 psi, respectively, are well within the operating ranges of standard airless spraying systems which could be used with the method and apparatus of this invention.

The method of the present invention is first discussed followed by a description of an apparatus in its various embodiments, which can be used to practice the method of the invention.

METHOD OF OPERATION

The method of this invention is predicated upon the observation that coating material formulations consisting essentially entirely of the resin rich phase (i.e., primarily resin and solvent with some supercritical fluid) can often be sprayed onto a substrate with acceptable application characteristics when the resin rich phase is at or near the "two phase" or saturation point. As defined above, the resin rich phase becomes saturated at given pressure and temperature conditions when it cannot absorb any more fluid diluent, and wherein further attempts to dissolve additional fluid diluent or supercritical fluid into the resin rich phase produces a "two phase" mixture of resin rich phase and fluid diluent rich phase. The saturation point for a given resin rich phase can be "moved" or varied by changing pressure within the closed vessel at constant temperature, or conversely, by changing the temperature within the vessel at constant pressure. At different saturation points, the resin rich phase contains different proportions of resin, solvent and supercritical fluid. It has been observed that, in cases where the dispenser is a paint spray gun, saturated, resin rich phases with different proportions of resin, solvent and supercritical fluid produce different spray patterns of coating on a substrate, some of which are better than others. The method of this invention is therefore predicated upon the concept of producing a saturated, resin rich phase by combining a liquid coating composition (resin and solvent) with a supercritical fluid, in a simple, reliable and inexpensive manner, and then controlling the pressure and temperature within the vessel so that the resin rich phase reaches a saturation point where the particular proportions of resin, solvent and supercritical fluid forming the resin rich phase exhibit optimum application characteristics when sprayed onto a substrate.

Reference is made to FIG. 1 to explain the concept of "moving" the saturation point of the resin rich phase, and how a "two phase" mixture of resin rich phase and fluid diluent rich phase can be produced. FIG. 1 shows a phase diagram commonly known as a triangle diagram for a hypothetical coating material formulation at a given temperature and at three different pressures, e.g., $P_1=1,000$ psi; $P_2=1,200$ psi; and, $P_3=2,000$ psi. The curved lines $P_1$, $P_2$ and $P_3$ show the two phase boundary lines of the coating material formulation. For example, referring to the $P_2$ curve, the area above the curve represents the single phase region at the $P_2$ pressure where only a single phase would exist. Below the curve for $P_2$, the formulation cannot exist as a single phase and separates into two phases along a "tie line" identified in FIG. 1. As shown in FIG. 1, assuming a liquid coating composition consisting of 60% resin solids and 40% solvent, as shown at point A, is combined with supercritical carbon dioxide at a constant $P_2$ pressure of 1,200 psi, the liquid coating composition will absorb the supercritical carbon dioxide up to its saturation point represented by the point B on curve $P_2$. Point B represents the composition of the resin rich phase. The tie line, mentioned above, starts at point B and intersects curve $P_2$ at a point C which represents the composition of the supercritical carbon dioxide or fluid diluent rich phase. The resin rich phase and the fluid diluent rich phase are in equilibrium with each other at this temperature and pressure and can thus simultaneously coexist as two distinct phases.

The triangle diagram illustrated in FIG. 1 is useful to determine the relative proportions of resin, solvent and supercritical carbon dioxide in both the resin rich phase and fluid diluent rich phase. To determine the resin composition of the resin rich phase represented by point B, for example, one begins at the side opposite the resin apex and counts the number of 10% increment lines which are crossed in order to reach point B. Five lines are crossed to reach point B and therefore the resin content is 50%. Following this same procedure, the remaining components of the formulation are found to be 32% solvent, and 18% supercritical carbon dioxide. Likewise, using the same procedure, the composition of the supercritical carbon dioxide or fluid diluent rich phase is determined to be approximately 4.5% resin, 13% solvent and 82.5% supercritical carbon dioxide.

The triangle diagram of FIG. 1 also illustrates the typical effect that pressure has on the two phase or saturation point of the resin rich phase. As shown in FIG. 1, as the pressure increases from $P_1$ to $P_3$, the curve is pushed down. The composition of the resin rich phase at $P_1$ (1,000 psi) is represented by point D, and point E represents the resin rich phase composition at $P_3$ (2,000 psi). Reading the diagram, approximately a 12.5% supercritical carbon dioxide content is present in the resin rich phase at the 1,000 psi pressure. As noted above, the supercritical carbon dioxide present in the resin rich phase at the 1,200 psi pressure is about 18%. Reading the diagram, it is determined that approximately 40% supercritical carbon dioxide is present in the resin rich phase at 2,000 psi. Thus, the higher the pressure at which the liquid coating composition and supercritical carbon dioxide are combined, the greater the proportion of supercritical carbon dioxide which is forced into or absorbed by the resin rich phase in order to reach the saturation point.

While it is not shown in FIG. 1, variation in temperature within the vessel normally has a reverse effect on the supercritical carbon dioxide content of the resin rich phase, compared to pressure variation. Whereas increasing pressure forces more supercritical carbon dioxide into the resin rich phase, increasing temperature forces more supercritical carbon dioxide out of the resin rich phase and into the fluid diluent rich phase. Likewise, whereas reducing pressure results in the loss of supercritical carbon dioxide from the resin rich phase, reducing temperature drives carbon dioxide into the resin rich phase. Thus, whereas increasing pressure at constant vessel temperature pushes the curve down in FIG. 1, increasing temperature at constant vessel pressures would push the curve up and vice versa.

In the presently preferred embodiment of this invention, the above-described method of this invention is advantageously performed within a closed, pressurized vessel wherein the liquid coating composition and fluid diluent or supercritical carbon dioxide can be introduced in a controlled manner and within which the pressure and temperature can be accurately controlled. According to the method of the present invention, the closed vessel is first supplied with a liquified gas through a pressure regulator. When using liquified carbon dioxide, for example, the vessel is maintained at a pressure and temperature above the critical pressure (1,070 psi) and critical temperature (85° F.) for carbon dioxide to produce supercritical carbon dioxide which fills the vessel interior. The coating material composition is then introduced into the vessel in such a way that contact with, or exposure to, the supercritical carbon dioxide is maximized to enable the liquid coating composition to absorb the supercritical carbon dioxide up to its saturation point for the temperature and pressure conditions within the vessel. In one embodiment, the liquid coating composition is sprayed in atomized droplets from the top of the vessel which is preferably a vertically oriented, cylinder-shaped tank. In another embodiment, the coating material passes through a baffle tube containing supercritical carbon dioxide which is installed in the top portion of the vessel. In both embodiments, the liquid coating composition is allowed to become saturated with supercritical carbon dioxide as it passes down through the vessel so that a resin rich phase, saturated with supercritical carbon dioxide, collects on the bottom of the vessel.

In the course of introducing virgin liquid coating composition into the vessel, the supercritical carbon dioxide which initially occupied the entire volume of the vessel absorbs solvent and resin from the liquid coating composition to form a fluid diluent rich phase, as defined above. This fluid diluent rich phase is less dense than the resin rich phase, because it contains a higher proportion of supercritical carbon dioxide, and therefore the fluid diluent rich phase remains in the upper portion of the vertical vessel above the level of the denser, resin rich phase which collects under the influence of gravity on the bottom of the vessel. The resin rich phase is substantially continuous with possibly small bubbles or microbubbles of the supercritical carbon dioxide or fluid diluent rich phase entrained therein. This resin rich phase, with perhaps some entrained fluid diluent rich phase bubbles, is then drawn off the bottom of the vessel and supplied to one or more dispensers such as spray guns as a coating material formulation for deposition on a substrate.

The temperature can be maintained in the vessel by conventional heaters and temperature control means. The pressure is maintained by the pressure regulator which supplies the liquid carbon dioxide into the vessel. The amount of coating material formulation desired in the vessel can be maintained by simple level controls connected to the lines which supply virgin liquid coating composition to the vessel. It can therefore be appreciated that the method of this invention is useful to reliably produce a controlled quantity of a coating material formulation consisting substantially entirely of the saturated, resin rich phase, at or very close to its two phase point, for ready delivery to one or more coating dispensers such as spray guns.

As described above, the higher density of the resin rich phase can be expected to separate within the vessel from the lower density fluid diluent rich phase by operation of gravity. But it is conceivable that for some coating material formulations, the difference in density between the two phases would not be adequate to achieve sufficient separation of the phases due to the chemical tendencies of some formulation compositions to form an emulsion. For these types of two phase compositions, other mechanisms known to those skilled in the art, such as a centrifuge, can be used to break or separate the emulsion into two substantially distinct phases.

In addition, while in the above process it is generally the case and is preferred that only two phases be produced, e.g., a liquid coating composition rich phase and a fluid diluent rich phase, it is also possible that a "solvent rich phase" could be produced. The term "solvent rich phase" refers to a combination of solvent, resin and supercritical fluid which is predominantly comprised of solvent, and which has an intermediate density between the other two phases. Due to the intermediate density of the solvent rich phase, it would be located in the vessel above the liquid coating composition rich phase and below the fluid diluent rich phase. Because the higher density liquid coating composition rich phase resides at the bottom of the vessel, with or without the addition of a solvent rich phase, this liquid coating composition rich phase is always available to be drawn off the bottom of the vessel in the normal manner. It may be necessary, however, to adjust the level sensor if the normal level sensor reading is affected by the presence of the solvent rich phase. Otherwise, however, in all cases to date where the solvent rich phase has been observed, there has been an adequate head space provided for the fluid diluent rich phase to saturate the atomized droplets of liquid coating composition with supercritical fluid so the operation of the vessel according to the process of this invention has not been affected.

Having described this inventive method, apparatus for practicing the invention are described below which illustrate that not only is the method herein reliable and far less complicated than other systems, but relies on relatively inexpensive and easy-to-use hardware.

EMBODIMENT OF FIGS. 2 AND 3

Figure 2:
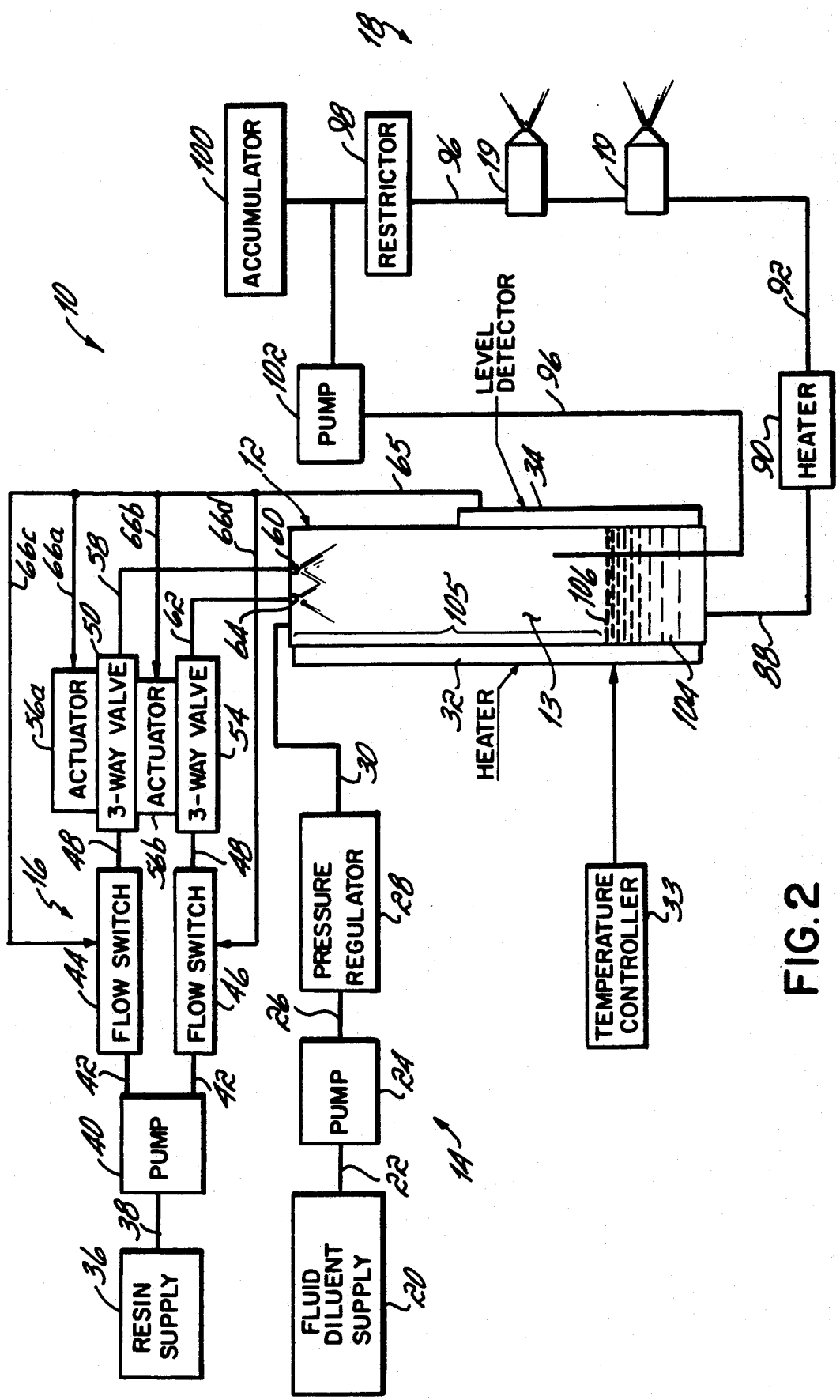
FIG. 2 is a schematic, block diagram of one embodiment of the apparatus of this invention.
Figure 3:
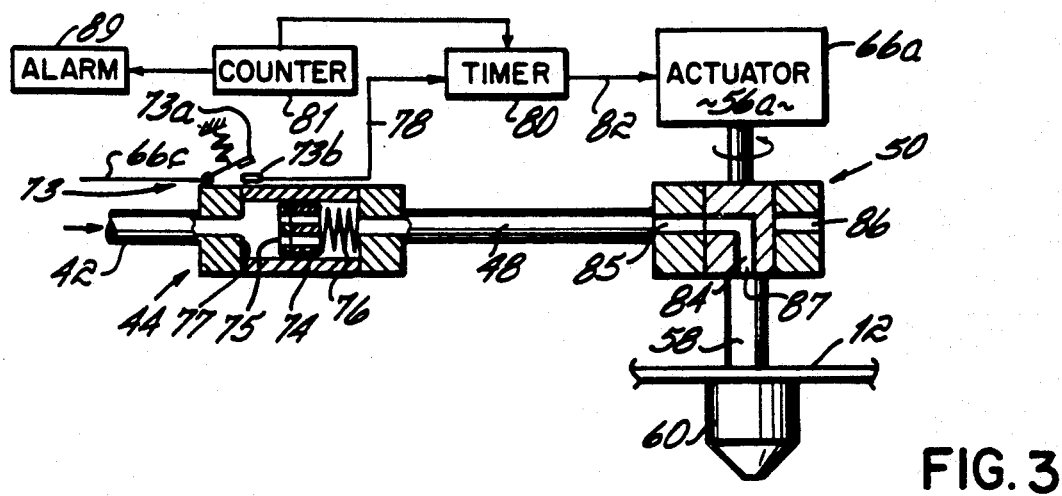
FIG. 3 is a schematic view in greater detail of the valve arrangement associated with the supply of liquid coating composition.

Referring now to FIGS. 2 and 3, one presently preferred embodiment of an apparatus 10 for practicing the method of this invention generally comprises a closed vessel 12, a fluid diluent or liquid carbon dioxide supply 14, a liquid coating composition or resin supply 16, and a supply and recirculation loop 18 for transmitting the coating material formulation to one or more coating dispensers 19. The liquid carbon dioxide supply 14 comprises a tank 20 containing liquid carbon dioxide. The tank 20 is connected by a line 22 to a piston pump 24, preferably of the type sold by the Haskell Company of Burbank, Calif. under Haskell Pump Model No. DSF-35. The liquid carbon dioxide is discharged from the output side of the piston pump 24 above the critical pressure through line 26 to a fluid pressure regulator 28, preferably of the type sold by Nordson Corporation of Westlake, Ohio under Nordson Part No. 248,830. The liquid carbon dioxide is discharged from the pressure regulator 28 through line 30 to the top of closed vessel 12 as illustrated in FIG. 1. As discussed below in connection with the operation of apparatus 10, the liquid carbon dioxide is introduced into the closed vessel 12 first, at a pressure of about 1200 psi, which is above the critical pressure of supercritical carbon dioxide. The liquid carbon dioxide is heated inside the vessel to a temperature above the critical temperature to produce supercritical carbon dioxide, and thereafter liquid coating composition or resin from the resin supply 16 is introduced into the closed vessel 12 for combination with the supercritical carbon dioxide.

In the presently preferred embodiment, the column or closed vessel 12 is a vertically oriented, generally cylindrical-shaped tank which is approximately 3 feet in height and 4 inches in diameter. A blanket heater 32 is mounted in intimate contact with the exterior surface of the vessel 12, and preferably is of the type sold by Watlow Cleveland Company of Chardon, Ohio under the Part No. 190200A. This heater 32 delivers 1500 watts when energized with 240 volts and is effective to maintain the temperature of the material within vessel 12 at the desired temperature by means of a temperature controller 33. Temperature controller 33 is a Cal Series 9000 microprocessor based temperature controller Model No. 911.11F supplied by Cal Control Incorporated of Libertyville, Ill. The vessel 12 also carries a level detector 34 of the type sold by the Endress & Hauser, Inc. of Greenwood, Ind. under the Part No. LSC1120. As described in more detail below, the level detector 34 is effective to sense the level of the saturated resin rich phase of the coating material formulation within the interior 13 of vessel 12 during the course of operation of apparatus 10.

Referring to the top portion of FIG. 2, the liquid coating composition or resin supply system 16 comprises a resin supply container 36 connected by a line 38 to a piston pump 40 of the type sold by Nordson Corporation of Westlake, Ohio under Nordson Model No. 25B. The discharge side of piston pump 40 is connected through a suitable T connection (not shown) to branch lines 42 which are in turn connected to a pair of flow switches 44 and 46 preferably of the type sold by or similar to Whitman Controls of Bristol, Conn., under Model No. P865-2. The flow switch 44 is connected by a line 48 to a three-way, air operated valve 50, and the flow switch 46 is connected by a line 48 to an identical three-way valve 54. Each of the three-way valves 50 and 54 are preferably of the type manufactured by the Whitey Company of Highland Heights, Ohio under the Model No. SS-83XKF4-KL. As described in more detail below, each three-way valve 50 and 54 has an air operator or actuator 56a, 56b, respectively, preferably of the type manufactured by the Whitey Company under Model No. MS-153-SR. The three-way valve 50 is connected by a line 58 to a spray nozzle 60 mounted at the top of vessel 12, and three-way valve 54 is connected by a line 62 to a spray nozzle 64 mounted at the top of vessel 12 beside the spray nozzle 60. A line 65 interconnects the level detector 34 with actuator 56a through line 66a, actuator 56b through line 66b, flow switch 44 through line 66c, and flow switch 46 through line 66d. As described in more detail below, the level detector 34 sends a signal through line 65 and then through lines 66a, b to the actuators 56a, 56b, respectively, which open or close the three-way valves 50, 54 depending upon the level of the resin rich phase of the coating material formulation present within the closed vessel 12.

The liquid coating composition or resin supplied from the resin supply 16 can contain impurities which could clog one or both of the spray nozzles 60, 64. The resin supply 16 is therefore provided with an unclog capability depicted in FIGS. 2 and 3 to clear the nozzles 60, 64 of such impurities.

FIG. 3 shows the unclogging mechanism for nozzle 60 only, but the mechanism for nozzle 64 is identical and directly parallels the mechanism shown in FIG. 3. As illustrated in FIG. 2, whenever level control 34 detects a resin rich phase level which is too low, it sends a "resin needed" signal via line 65 to the lines 66a, 66b connected to the actuators 56a, 56b for valves 50, 54 so that the valves 50, 54 can be rotated by actuators 56a, 56b to the position shown in FIG. 3 to supply resin to the nozzles 60, 64. This same "resin needed" signal is sent via line 65 to the lines 66c, 66d connected to the flow switches 44, 46, respectively. As shown in FIG. 3, line 66c is connected to one side of a reed switch 73 which is spring-biased to the open condition. One magnetized contact 73a of reed switch 73 is supported on the outside of flow switch 44 and is connected by a line 78 to a timer 80. A stepped, central flow passage is formed in flow switch 44 which slidably receives a floating slug 74 carrying a magnet 75. As viewed in FIG. 3, both the floating slug 74 and magnet 75 are formed with throughbores to permit the passage of liquid coating composition therethrough. A spring 76 urges the slug 74 and magnet 75 upstream, or to the left as viewed in FIG. 3, into contact with the shoulder 77 formed in the wall of flow switch 44 by the stepped bore. In the normal operation of flow switch 44, liquid coating composition flows through flow switch 44, and through the bores in magnet 75 and slug 74, which unseats the magnet 75 from contact with shoulder 77 and pushes the magnet 75 and slug 74 downstream or to the right as viewed in FIG. 3 against the force of spring 76. In the event of a clog of nozzle 60, resin builds up in the lines 48, 58 between the nozzle 60 and flow switch 44, thus reducing or stopping the flow through flow switch 44 and causing the magnet 75 to seat against shoulder 77 under the force of spring 76. This, in turn, places magnet 75 directly under the contacts 73a, 73b of reed switch 73. Because contact 73a of reed switch 73 is magnetized, it is attracted towards magnet 75 and makes contact with contact 73b to close the switch 73 between line 66c and line 78.

Therefore, if resin is called for by the level detector 34, i.e., if a resin needed signal is sent through line 66c to flow switch 44, and the magnet 75 fails to unseat, the electrical circuit described above is completed through flow switch 44, and an unclogging procedure is initiated as follows. Timer 80 energizes the actuator 56 through line 82 to rotate the three-way valve 50 such that an internal passage 84 therein is shifted out of contact with an inlet port 85 formed in the three-way valve 50 which is connected to line 48 from the flow switch 44. The internal passage 84 is moved by actuator 56 into contact with a vent port 86 formed in three-way valve 50 which opens to atmosphere. Such movement of internal passage 84 blocks the flow of resin from the flow switch 44 into the valve 50, and forms a flow path from the nozzle 60 in an upstream direction through line 58, into the outlet 87 of internal passage 84 and then through the vent port 86 to atmosphere. With the three-way valve 50 in this position, the pressurized fluid diluent rich phase within the vessel interior 13 flows upstream in the reverse direction through the nozzle 60, line 58, internal passage 84 and out the vent port 86 in three-way valve 50 carrying with it impurities which have clogged nozzle 60.

In the presently preferred embodiment, the timer 80 causes the three-way valve 50 to rotate into this unclogging position for a fixed period of time, after which the valve 50 is returned to its original position to permit the passage of resin therethrough. In the event the unclogging operation is unsuccessful, slug 74 remains in contact with shoulder 77, and timer 80 automatically repeats the unclogging cycle. A counter 81 counts each time the actuator 66a is energized by timer 80 within a given period of time, and if the clog still remains after five cycles within a predetermined time period an alarm 89 is sounded. If less than five cycles occur within such predetermined time period, the counter 81 resets itself. It should be understood that the identical structure described above is employed to clear nozzle 64 associated with three-way valve 54.

Returning to FIG. 2 and referring to the righthand portion thereof, a supply and recirculation loop 18 is provided which includes a line 88, connected to the bottom of vessel 12, which draws a coating material formulation consisting substantially entirely of the resin rich phase from the bottom of vessel 12. Line 88 is connected to a heater 90 preferably of the type sold by Nordson Corporation of Westlake, Ohio under Model No. NH4. The coating material formulation is transmitted from the heater 90 through line 92 to one or more coating dispensers 19. Heater 90 maintains the coating material at an appropriate temperature above the critical temperature for supercritical carbon dioxide while the coating material is in loop 18. The coating dispensers 19 are operative to discharge coating material formulation onto a substrate as required.

When the coating dispensers 19 are not operated, or are operated intermittently, the coating material formulation is recirculated through a return line 96 and then through a restrictor 98 of the type sold by Whitey Valve Company of Highland Heights, Ohio under the Part No. SS-IRS6. The coating material then passes through a piston pump 102 of the type sold by Nordson Corporation of Westlake, Ohio under Nordson Model CP which pumps the material back into vessel 12. An accumulator 100 of the type sold by Parker Hannifin Corporation of Hillsborough, N.C. under the Part No. A2A0029A1A1E, is installed in the circulation line between restrictor 98 and pump 102 to maintain a relatively constant input pressure at the inlet of pump 102.

In an alternative embodiment, return line 96, restrictor 98 and accumulator 100 could be removed if it is desired to "dead end" the flow of coating material formulation at the coating dispensers 19 and not recirculate it back to the vessel 12. In such embodiment, the pressure inside the vessel 12 forces the coating material formulation through line 88, heater 90, and line 92 to the dispensers 19.

OPERATION OF FIGS. 2 AND 3 EMBODIMENT

With reference again to FIGS. 2 and 3, the operation of apparatus 10 is described as follows. First, the vessel heater 32 is set at an appropriate temperature above the critical temperature for carbon dioxide. Then, a fluid diluent such as liquid carbon dioxide is pumped into the vessel interior 13 by the liquid carbon dioxide supply 14 at a pressure above the critical pressure. The liquid carbon dioxide quickly achieves the critical temperature within the heated vessel 12 and is thereby transformed to supercritical carbon dioxide. Liquid carbon dioxide is continually supplied to the vessel 12 until the entire interior 13 of vessel 12 is filled with supercritical carbon dioxide to a preselected pressure of 1200 psi, for example.

Level detector 34 is then turned on with the result that three-way valves 50, 54 are opened to permit the flow of "resin", i.e., liquid coating composition, from the resin supply 16 to the spray nozzles 60, 64. The spray nozzles 60, 64 atomize the liquid coating composition into relatively small droplets which are sufficiently exposed to the supercritical carbon dioxide while falling through vessel 10 that they become saturated with supercritical carbon dioxide and form a resin rich phase having a particular proportionate content of resin, solvent and supercritical carbon dioxide for the temperature and pressure conditions within the vessel 12. These saturated, resin rich phase droplets fall under the influence of gravity toward the bottom of vessel 12 where they collect and form a body of coating material formulation 104.

In the presently preferred embodiment, the quantity of resin rich phase forming the coating material formulation 104 within the vessel interior 13 is preferably maintained at a height of about 7 inches compared to the total height of 3 feet of the vessel 12. That portion or space 105 of the vessel interior 13 between the top surface 106 of the formulation 104 and the top of vessel 12 is filled predominantly with supercritical carbon dioxide rich phase, i.e., fluid diluent rich phase. After the initial introduction of virgin liquid coating composition into the vessel 12, the supercritical carbon dioxide within the vessel 12 is substantially converted to the fluid diluent rich phase which occupies space 105. It is contemplated that a small amount of fluid diluent rich phase may be intermixed with the resin rich phase or formulation 104 at the bottom of vessel 12 in the form of bubbles or microbubbles, but generally the top portion or space 105 of vessel 12 contains fluid diluent rich phase above the level of predominantly resin rich phase at the bottom of vessel 12.

It has been observed that with some liquid coating compositions, when the composition is initially introduced into the vessel filled with essentially pure supercritical carbon dioxide, the solvent is sometimes immediately "stripped" from the liquid coating composition to form the supercritical carbon dioxide rich phase. As a result, insufficient solvent remains to properly form the resin rich phase so that a resin rich phase is initially formed which is "solvent poor" and does not produce a satisfactory coating on a substrate. Consequently, with these types of liquid coating compositions, the first "charge" of liquid coating composition may be dispensed from the dispensers into a waste container. Alternatively, prior to introducing the liquid coating composition into the vessel 12, a small charge of solvent can be introduced into the vessel from a solvent supply and pump through a suitable valve (not shown) to begin formation of the supercritical carbon dioxide rich phase by initially saturating, or partially saturating, the supercritical carbon dioxide with solvent prior to the introduction of the liquid coating composition.

The discharge line 88 from vessel 12 is connected to the bottom of vessel 12 in position to remove the coating material formulation 104, comprised substantially entirely of the resin rich phase, from the vessel 12 for transmission to the coating dispensers 19. It is contemplated that at least some pressure drop will occur in the course of transmitting the formulation from the vessel 12 to the coating dispensers 19. This pressure drop can cause the growth or formation of fluid diluent rich phase bubbles within the coating material formulation since lowering pressure releases some of the supercritical carbon dioxide from the resin rich phase into the fluid diluent rich phase as was explained above with reference to FIG. 1. The presence of at least some fluid diluent rich phase bubbles can, however, assist in the atomization of the coating material formulation upon discharge from the coating dispensers 19 where dispensers 19 are spray guns. That is, the fluid diluent rich phase bubbles, as well as the dissolved supercritical carbon dioxide in the resin rich phase, rapidly expand upon discharge from the coating dispensers 19 to atmosphere which enhances the atomization of the formulation prior to deposition on a substrate. Moreover, the preformation of bubbles in the coating material formulation prior to the spray orifice can make the coating material easier to atomize as is taught in the prior art U.S. Pat. Nos. 4,247,581 and 4,630,774 discussed above.

One important aspect of this invention is the provision of means to relatively accurately control the proportion of liquid coating composition or resin, to supercritical carbon dioxide, in the coating material formulation to be dispensed. The desired proportion of these materials can vary substantially from one type of liquid coating composition to another, and the apparatus 10 must be capable of accommodating liquid coating compositions of different types and of maintaining the appropriate relative proportion of liquid coating composition to supercritical carbon dioxide during the course of an operating run.

The preferred proportion of liquid coating composition to supercritical carbon dioxide is determined by alternative calibration procedures performed by the operator of apparatus 10. In one calibration procedure, vessel temperature is fixed while pressure is varied, and in the other calibration procedure the vessel pressure is fixed while temperature is varied.

Referring to the former procedure, initially liquid carbon dioxide is introduced into the vessel interior 13 where it is converted to the supercritical state, and then liquid coating composition is added as described above. With vessel temperature held constant, several test sprays, or dispensing samples, are made of the resulting coating material formulation using different pressure settings of the pressure regulator 28.

For a given type of liquid coating composition, as discussed above, variation of the pressure setting of pressure regulator 28 changes the saturation point of the resin rich phase (i.e., the two phase point), resulting in variations of the relative proportion of supercritical carbon dioxide to liquid coating composition in the resin rich phase of the coating material formulation formed at the bottom of vessel 12. In the case where dispenser 19 is a spray gun, by changing the settings of pressure regulator 28, the operator can make a number of test sprays from coating dispensers 19 and determine which pressure setting forms a coating material formulation having the desired spray pattern for a given substrate. While the resin rich phases produced at different pressures are at or near their respective saturation points, some formulations produce superior spray patterns due to the changing supercritical carbon dioxide content. A pressure can therefore be selected which produces an optimal spray pattern, and this preferred pressure setting is then used during a production run for a particular liquid coating composition, with the temperature of vessel 12 held at the temperature setting used during the calibration mode.

According to the alternative calibration procedure, the liquid carbon dioxide is again introduced into the vessel interior where it is converted to the supercritical state within vessel interior 13, and liquid coating composition is added as described above. With vessel pressure held constant, several test sprays, or dispensing samples, are made using different temperature settings by means of temperature controller 33. As discussed above, for a given type of coating material composition, variation of the temperature setting of temperature controller 33 changes the saturation point of the resin rich phase, resulting in variations of the relative proportion of supercritical carbon dioxide to liquid coating composition in the resin rich phase of the coating material formulation. Where dispenser 19 is a paint spray gun, by changing the setting of temperature controller 33 the operator can make a number of test sprays from coating dispensers 19 and determine which temperature setting forms a coating material formulation having the desired spray pattern for a given substrate. While the resin rich phases produced at the different temperatures are all at or near their respective saturation points, some produce superior spray patterns due to their composition. A temperature can therefore be selected which produces the optimal spray pattern, and this temperature setting can be used during production runs, with the pressure of vessel 12 held at the pressure setting used during the calibration mode.

As mentioned above, the level detector 34 functions to sense the level or height of the resin rich phase of coating material formulation 104 within the vessel interior 13 and sends a corresponding signal to the actuators 56a, 56b associated with three-way valves 50 and 54. In the event the level of the resin rich phase 104 within the vessel interior 13 falls below the preferred level of about 7 inches, the level detector 34 signals the actuators 56a, 56b to open three-way valves 50, 54 to provide additional virgin liquid coating composition or resin into the vessel 12. In the embodiment of FIGS. 2 and 3, the supply of material into the vessel 12 is supplemented by recirculation of unused coating material formulation through return line 96 in the event such material is not dispensed from the coating dispensers 19. As seen in FIG. 2, this recirculated coating material formulation is introduced by return line 96 into the space 105 above the surface 106 of the coating material formulation 104 within vessel 12 for combination with the fluid diluent rich phase in such space 105 so that additional supercritical carbon dioxide can be dissolved into the recirculated formulation, if necessary, to bring it back up to the saturation point.

ALTERNATIVE EMBODIMENT OF FIG. 2A

Figure 2A:
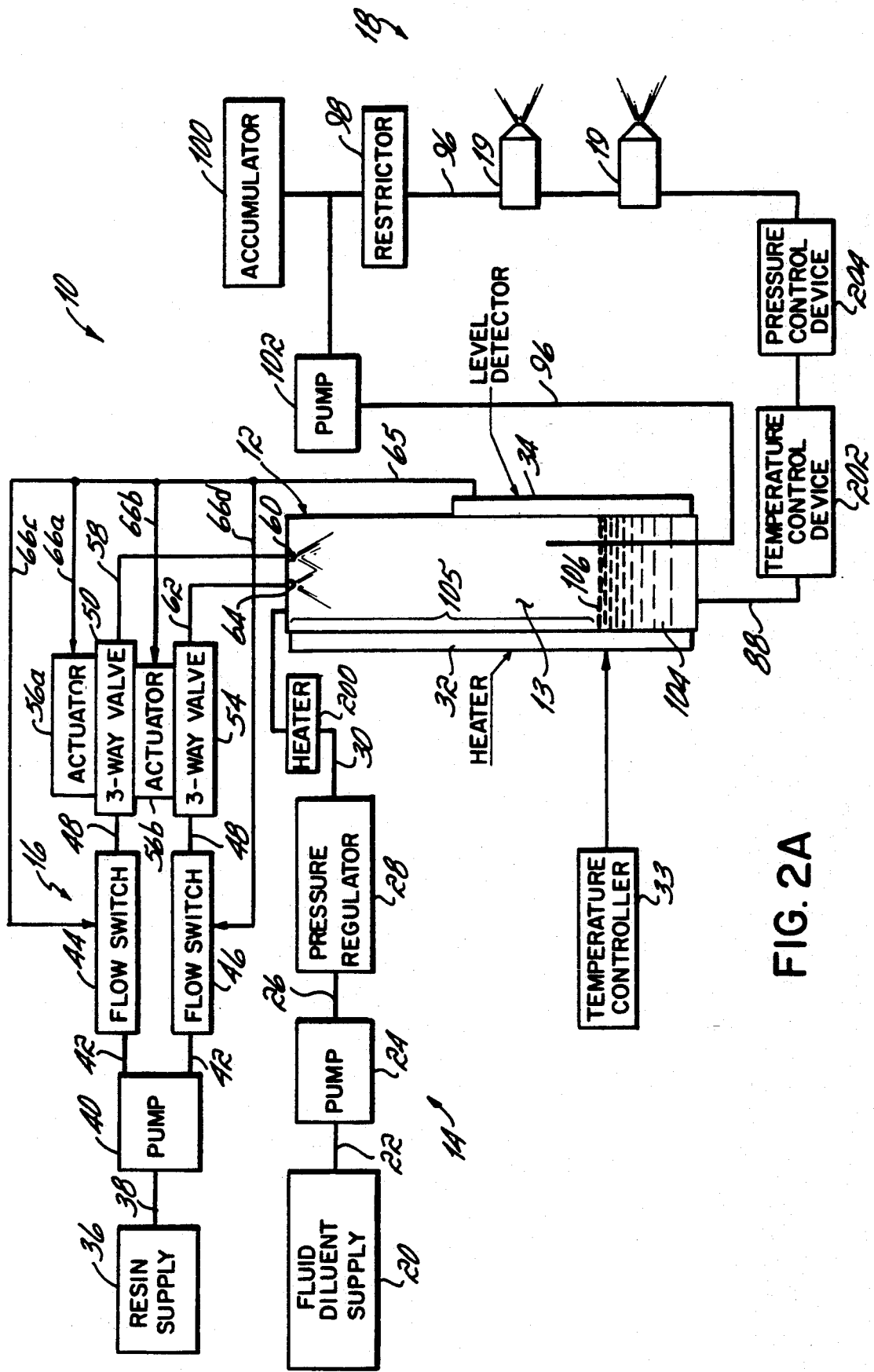
FIG. 2A is an alternative embodiment of the apparatus shown in FIG. 2.

FIG. 2A shows various modifications of the basic system shown in FIG. 2. For the purposes of this discussion, the structure of FIG. 2A which is common to that of FIG. 2 is given the same reference numbers.

A heater 200 is shown in the line 30 between pressure regulator 28 and vessel 12. In the FIG. 2 embodiment, as described above, liquid carbon dioxide below the critical temperature is introduced into vessel 12 and is transformed into supercritical carbon dioxide within the vessel 12 because the heater 32 maintains the vessel interior 13 at a temperature in excess of the critical temperature for carbon dioxide. But introducing liquid carbon dioxide below the critical temperature into vessel 12 may be undesirable in some situations, such as at high flow rates where the liquid carbon dioxide may have too much of a cooling effect on contents of vessel 12. This can cause coagulation of the liquid coating composition within vessel 12, because liquid carbon dioxide is not as good a solvent as supercritical carbon dioxide. To avoid this condition, in the embodiment of FIG. 2A the liquid carbon dioxide is heated above the critical temperature in heater 200 and thereby transformed into supercritical carbon dioxide before being introduced into vessel 12. Pressure regulator 28 maintains the liquified carbon dioxide above its critical pressure as in the embodiment of FIG. 2.

Another variation shown in FIG. 2A is the placement of a temperature control device 202 and pressure control device 204 in the line 88 between the vessel 12 and the dispensers 19. Temperature control device 202 could be a heater such as the heater 90 shown in FIG. 2, or it could be a chiller. The function of the temperature control device 202 in FIG. 2A is to vary the temperature of the coating material formulation drawn from the bottom of vessel 12 to either suppress or encourage the formation of fluid diluent rich phase bubbles in the resin rich phase. If device 202 increases the temperature of the formulation, then the formation and expansion of fluid diluent rich phase bubbles will increase since the increasing temperature will drive supercritical carbon dioxide out of the resin rich phase and into the supercritical carbon dioxide rich phase. Conversely, if the temperature of the formulation is reduced by device 202, the formation of fluid diluent rich phase bubbles will be suppressed as the supercritical carbon dioxide in any fluid diluent rich phase bubbles which are present will be driven into the resin rich phase. Thus, device 202 can be used to control the size and number of fluid diluent rich phase bubbles in the formulation in line 88, which, in turn, affects the spray pattern from dispensers 19.

Similarly, pressure control device 204 can be used for the same purpose. Pressure control device 204 can be a pump, such as a pump 102 in the circulation loop 18 which operates to increase the pressure in the formulation in line 88, or a pressure regulator to reduce the pressure of the formulation in line 88. By increasing the pressure, the device 204 will drive the supercritical carbon dioxide from any fluid diluent rich phase bubbles into the resin rich phase suppressing bubble formation. Conversely, reducing the pressure will encourage bubble formation. Thus, like temperature control device 202, device 204 can be used to control the size and number of fluid diluent rich phase bubbles in the formulation delivered to dispensers 19 which will affect the spray pattern, or other dispensing pattern, produced.

In yet another embodiment (not shown), if pressure control device 204 is a pump, then pump 102 and accumulator 100 could be eliminated from the loop 18 in that they would not be necessary to circulate the coating material formulation around loop 18, and then return the formulation to vessel 12 if not dispensed.

ALTERNATIVE EMBODIMENTS OF FIGS. 4 AND 5

With reference to FIGS. 4 and 5, alternative embodiments of this invention are illustrated which employ much of the same structure described above in connection with FIGS. 2 and 3. For purposes of this discussion, the structure of FIGS. 4 and 5 which is common to that of FIGS. 2 and 3 is given the same reference numbers.

Referring to FIG. 4, an apparatus 108 is illustrated which is particularly adapted for liquid coating compositions or resins having a relatively high viscosity. High viscosity coating compositions may be more difficult to atomize with the spray nozzles 60, 64 of FIG. 2, which could reduce the exposure of the liquid coating composition to supercritical fluid to such an extent that saturation of the liquid coating composition to the two phase point would not occur. For such types of relatively high viscosity coating materials, apparatus 108 may better achieve the desired saturated condition. Apparatus 108 is identical to apparatus 10, except for a modification of the resin supply, the provision of a modified vessel 110 and the addition of a static mixer 112 of the type preferably sold by TAH Industries of Inlaystown, N.J. under the Model No. TAH Series 100.

In this embodiment, virgin liquid coating composition or resin is directed from a resin supply container 36 and pump 40 into a valve 113 which is connected by a line 115 to the static mixer 112. The flow switches 44, 46, three-way valves 50, 54 and actuators 56*a*, 56*b* of FIGS. 2 and 3 are eliminated.

Static mixer 112 is connected by a line 118 to modified vessel 110. Modified vessel 110 includes a baffle tube 114 containing a number of angled baffle plates 116 illustrated schematically in FIG. 4. Baffle tube 114 is mounted over an inlet 120 to the main body portion of vessel 110. Liquid carbon dioxide is supplied by the carbon dioxide supply 14 to the vessel 110 through a pressure regulator 28 and transformed within vessel 110 into supercritical carbon dioxide in the identical manner described above in connection with FIGS. 2 and 3. After the initial formation of a resin rich phase within vessel 110, a head or space 122 of fluid diluent rich phase is formed within the vessel interior 111 above a coating material formulation 124 which collects at the bottom of vessel 110. The fluid diluent rich phase also enters and fills the baffle tube 114 through inlet 120. As the virgin liquid coating composition flows down through the baffle tube 114, it is continually exposed to the fluid diluent rich phase and absorbs supercritical carbon dioxide up to the saturation point before being discharged from the baffle tube 114 into the interior 111 of vessel 110 to form the body of coating material formulation 124 at the bottom of vessel 110. As described above in connection with FIGS. 2 and 3, the body 124 of coating material formulation which collects at the vessel bottom consists substantially entirely of a resin rich phase with some entrained fluid diluent rich phase bubbles.

The coating material formulation is withdrawn from vessel 110 and enters loop 18 for transmission to dispensers 19, as described above. Coating material formulation not sprayed or dispensed from dispensers 19 enters return line 96 and flows through restrictor 98, past accumulator 100, and through pump 102 in the same manner as was described with reference to FIG. 2. In this embodiment, however, the outlet of pump 102 is delivered through line 96 into the line 115 between control valve 113 and static mixer 112. The recirculated coating formulation is thus merged with virgin coating material composition from supply 36 in line 115, and mixed together in static mixer 112, before being delivered into the top of baffle tube 114. By mixing the recirculated coating material formulation with the virgin liquid coating composition, the viscosity of the virgin liquid coating composition is at least partially reduced so that it is more easily saturated in baffle tube 114 with supercritical carbon dioxide up to the saturation point before being discharged from baffle tube 114 into vessel 110 as the coating material formulation.

Level detector 34 controls the level of the resin rich phase in vessel 110 in the same manner as described with reference to FIG. 2 except that when the level in vessel 110 is too low, the resin needed signal is sent along a line 120 to valve 113 which is a simple on/off valve. This on/off valve 113 supplies liquid coating composition through line 115 until it is shut off by another signal from level detector 34 via line 120.

Figure 5:
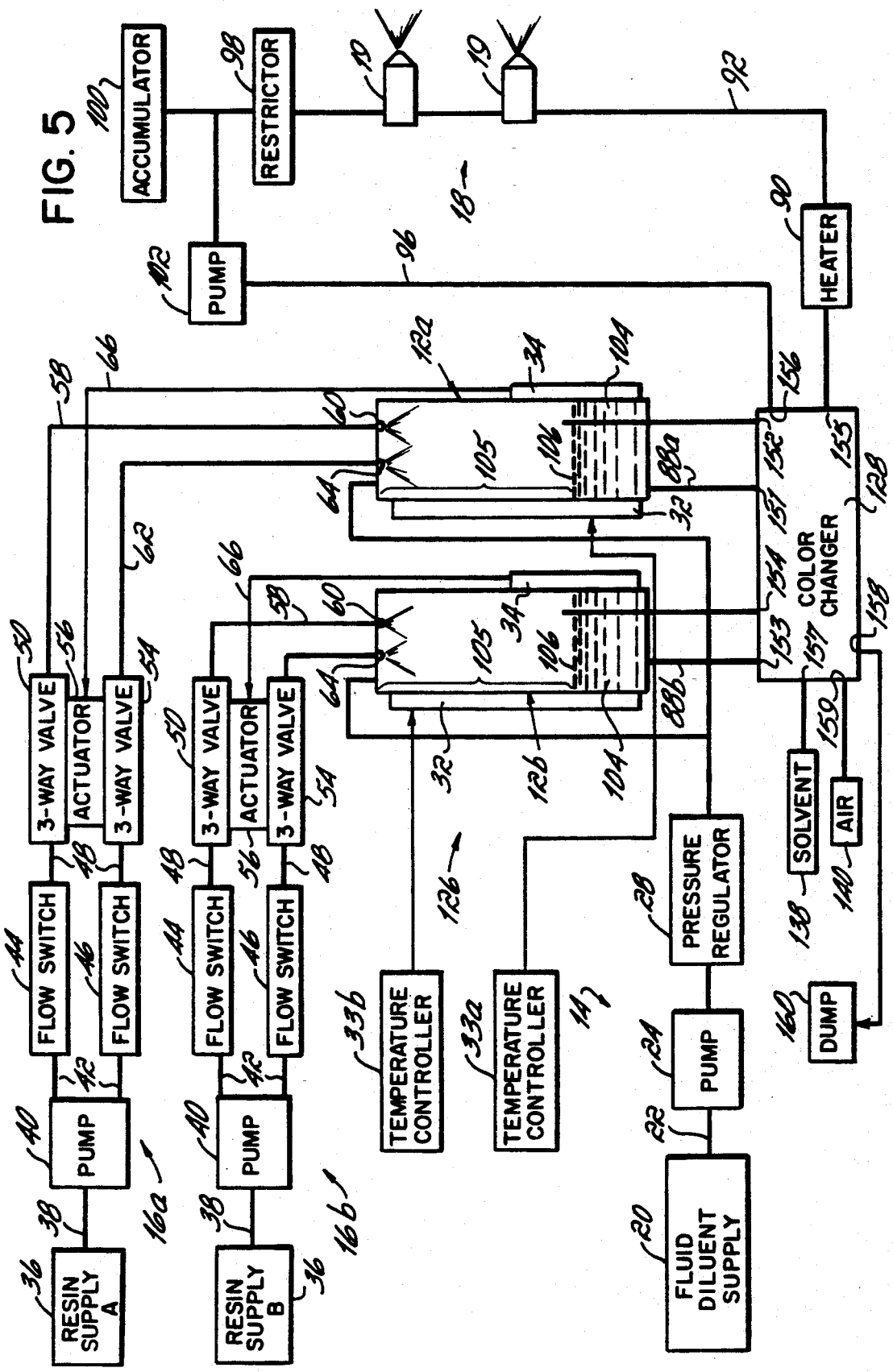
FIG. 5 is a block diagram of a still further embodiment of the apparatus of this invention.

With references to FIG. 5, a further alternative embodiment of an apparatus 126 of this invention is illustrated which is particularly adapted for applications wherein frequent color changes of the resin are required. In this apparatus 126, a first vessel 12a and a second vessel 12b are provided to receive liquid coating compositions, such as paint, of different color. The vessel 12a is connected to a resin supply 16a which provides a resin or liquid coating composition having a first color, and the vessel 12b is connected to a resin supply 16b which provides a resin having a second color. Both of the vessels 12a and 12b are supplied with liquid carbon dioxide from a single liquid carbon dioxide supply 14. The vessels 12a, 12b, the resin supplies 16a, 16b and the carbon dioxide supply 14 are identical in structure and function to those described above in connection with FIGS. 2 and 3.

In the presently preferred embodiment, a discharge line 88a from vessel 12a is connected to a color change manifold 128 of the type disclosed in FIGS. 1 and 3 of U.S. Pat. No. 4,657,047, or in U.S. Pat. No. 4,627,465, for example, owned by the assignee of this invention, the disclosures of which are incorporated by reference in their entireties herein. The color change manifold 128 has an inlet 151 for color A connected to line 88a from vessel 12a, as well as an outlet 152 from color changer 128 back into vessel 12a for returned or recirculated coating material formulation of color A. Likewise, color changer 128 has an inlet 153 for color B connected to line 88b from vessel 12b, as well as an outlet 154 from color changer 128 back into vessel 12b for recirculated coating material formulation of color B. If color A is selected at color changer 128, for example, valving in color changer 128 routes color A from inlet 151 to color changer outlet 155 which is connected to line 92 of loop 18. Color A coating material formulation is thereby delivered to spray guns 19 for spraying, and any unused color A formulation is returned from pump 102 and through return line 96 to color changer inlet 156. The color A formulation is then routed through valving in color changer 128 to outlet 152 so that it can be returned to vessel 12a.

To change to color B, the valving for color A inlet 151 and color A outlet 152 is first closed. Solvent 138 is then directed through solvent inlet 157 into the color changer 128, and through outlet 155 into loop 18 so that all elements of the loop 18, including guns 19, are flushed of color A. The flushed color A and solvent are returned to color changer 128 through inlet 156 and routed by valving in color changer 128 through dump outlet 158 into a dump tank 160. Pressurized air from a source 140 can then be admitted into the color changer manifold 128 through an inlet 159 so that it can push any remaining solvent through outlet 155 and circulation loop 18, and then back into inlet 156 and through the dump outlet 158. The pressurized air also dries the paint flow passages of color changer 128 and circulation loop 18 so that color changer 128 and loop 18 are clean, dry and ready for color B. The structure and function of the apparatus 126 of FIG. 5 is otherwise identical to that described in connection with FIGS. 1 and 2.

Figure 5A:
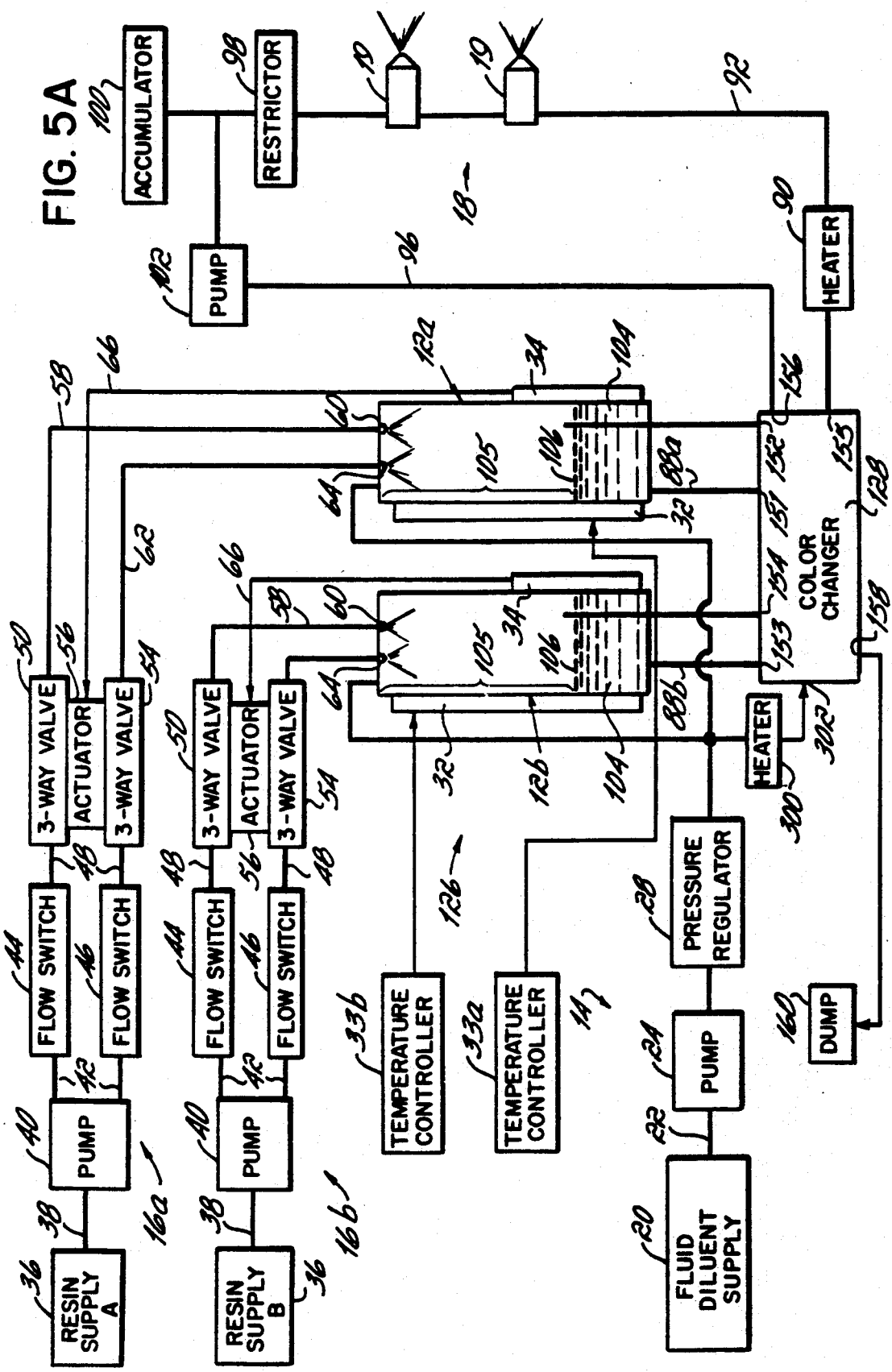
FIG. 5A is an alternative embodiment of the apparatus illustrated in FIG. 5.

A variation of the embodiment shown in FIG. 5 is shown in FIG. 5A. Whereas air and solvent were used to flush paint from the color changer 128 and loop 18 in FIG. 5, the FIG. 5A embodiment uses supercritical fluid diluent as the flushing solvent. Assuming carbon dioxide is used as the fluid diluent, liquid carbon dioxide discharged from the outlet of pressure regulator 28 above the critical pressure would be heated in a heater 300 above the critical temperature to transform the liquid carbon dioxide into supercritical carbon dioxide. The supercritical carbon dioxide is introduced into an inlet 302 to color changer 128 in place of the solvent supplied from supply 138 in the embodiment of FIG. 5. The supercritical carbon dioxide pushes the paint from the color changer 128, through loop 18 and then back through color changer 128 into the dump tank 160. Once the waste material had been dumped through outlet 158 into tank 160, the inlet 302 is closed by valving in color changer 128, and the paint flow passages in color changer 128 and loop 18 are depressurized through dump outlet 158. Depressurization of the supercritical carbon dioxide in the paint flow passages dries the paint flow passages in preparation for the next color of coating material formulation to be sprayed. In this embodiment, therefore, pressurized air would not be needed to purge or dry the system between color changes.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the central scope thereof.

Figure 4:
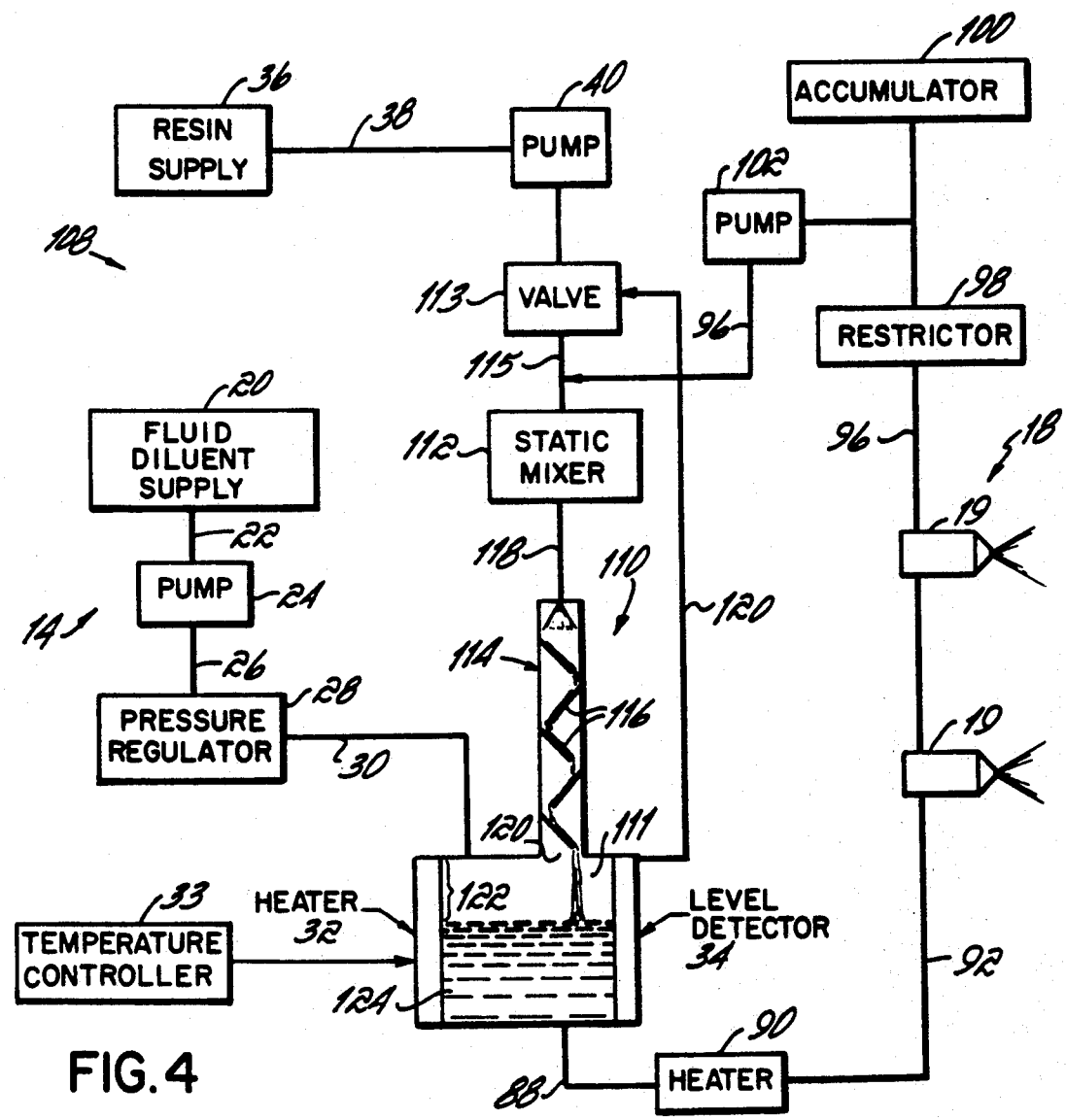
FIG. 4 is a block diagram of an alternative embodiment of the apparatus herein.

For example, a total of two vessels 12a and 12b been illustrated in the apparatus 126 of FIG. 5, but it should be understood that essentially any number of vessels 12 could be employed, as desired. Additionally, while the color changer embodiment of FIG. 5 is illustrated with vessels 12a and 12b of the type shown in FIG. 1 having spray nozzles 60, 64, it should be understood that two or more modified vessels 110 including baffle tube 114 as shown in FIG. 4 could be employed in the embodiment of FIG. 5. FIG. 5 is provided to illustrate the ease with which this invention can be adapted for use in applications requiring a number of different colored resins.

In addition, it is noted that the liquid carbon dioxide is introduced at the top of the vessels 12 in the various embodiments illustrated herein, but it should be understood that the liquid carbon dioxide could also be introduced at the bottom of the vessel 12 and flow upwardly for combination with the liquid coating composition.

Therefore, it is intended that the invention not be limited to the particular embodiment disclosed as the best mode contemplated for carrying out this invention, but that the invention will include all embodiments falling within the scope of the appended claims.

We claim:

1. The method of forming a coating material formulation for deposition onto a substrate, comprising:
   exposing a liquid coating composition to a fluid diluent within a closed, pressurized vessel so that at least a portion of the fluid diluent is dissolved within the liquid coating composition to form a liquid coating composition rich phase and a fluid diluent rich phase;
   separating the liquid coating composition rich phase and fluid diluent rich phase within the vessel to permit the withdrawal from the vessel of a coating material formulation consisting substantially entirely of the liquid coating composition rich phase for transmission to one or more dispensers for deposition on a substrate.

2. The method of claim 1 in which said step of exposing a liquid coating composition to a fluid diluent comprises exposing the liquid coating composition to the fluid diluent so that the liquid coating composition becomes substantially saturated with fluid diluent.

3. The method of claim 1 in which said step of exposing a liquid coating composition to a fluid diluent includes maintaining the interior of the closed pressurized vessel at or above the supercritical temperature and the supercritical pressure of the fluid diluent.

4. The method of claim 1 in which said step of exposing a liquid coating composition to a fluid diluent comprises spraying atomized droplets of liquid coating composition into the vessel within an area occupied by fluid diluent and/or the fluid diluent rich phase.

5. The method of claim 1 in which said step of exposing a liquid coating composition to a fluid diluent comprises directing the liquid coating composition through baffles within which fluid diluent and/or the fluid diluent rich phase are located.

6. The method of claim 1 in which said step of separating the liquid coating composition rich phase and fluid diluent rich phase comprises allowing the liquid coating composition rich phase to collect under the influence of gravity at the bottom of the vessel beneath the fluid diluent rich phase.

7. The method of producing and dispensing a coating material formulation containing a fluid diluent and a liquid coating composition, comprising:
   exposing a liquid coating composition to a fluid diluent within a closed, pressurized vessel so that at least a portion of the fluid diluent is dissolved within the liquid coating composition to form a liquid coating composition rich phase and a fluid diluent rich phase;
   withdrawing from the vessel a coating material formulation consisting substantially entirely of the liquid coating composition rich phase, and transmitting said coating material formulation to one or more dispensers for deposition on a substrate.

8. The method of claim 7 in which said step of exposing a liquid coating composition to a fluid diluent comprises exposing the liquid coating composition to the fluid diluent so that the liquid coating composition becomes substantially saturated with fluid diluent.

9. The method of claim 7 in which said step of exposing a liquid coating composition to a fluid diluent comprises spraying atomized droplets of liquid coating composition into the vessel within an area occupied by fluid diluent and/or the fluid diluent rich phase.

10. The method of claim 7 in which said step of exposing a liquid coating composition to a fluid diluent comprises directing the liquid coating composition through baffles within which fluid diluent and/or the fluid diluent rich phase are located.

11. The method of claim 7 in which said step of withdrawing from the vessel a coating material formulation comprises initially allowing the liquid coating composition rich phase to collect under the influence of gravity at the bottom of the vessel beneath the fluid diluent rich phase.

12. The method of claim 7 in which said step of transmitting said coating material formulation to one or more dispensers comprises controlling at least one of the temperature and pressure of said coating material formulation as it flows between the vessel and the dispensers to suppress or encourage the formation of fluid diluent rich phase bubbles within the liquid coating composition rich phase.

13. The method of claim 12 in which said step of controlling at least one of the temperature or pressure of said coating material formulation comprises increasing the temperature of said coating material formulation to increase the proportion of fluid diluent rich phase bubbles within the liquid coating composition rich phase, or decreasing the temperature of said coating material formulation to decrease the proportion of fluid diluent rich phase bubbles within the liquid coating composition rich phase.

14. The method of claim 12 in which said step of controlling at least one of the temperature or pressure of said coating material formulation comprises increasing the pressure of said coating material formulation to decrease the proportion of fluid diluent rich phase bubbles within the liquid coating composition rich phase, or decreasing the pressure of said coating material formulation to increase the proportion of fluid diluent rich phase bubbles within the liquid coating composition rich phase.

15. The method of claim 7 in which said step of exposing a liquid coating composition to a fluid diluent includes maintaining the interior of the closed pressurized vessel at or above the supercritical temperature and the supercritical pressure of the fluid diluent.

16. The method of producing and dispensing a coating material formulation containing a fluid diluent and a liquid coating composition, comprising:
   exposing a liquid coating composition to a fluid diluent within a closed, pressurized vessel to produce a liquid coating composition rich phase and a fluid diluent rich phase;
   controlling at least one of the pressure and temperature within the vessel to control the proportion of fluid diluent to liquid coating composition within the liquid coating composition rich phase;
   transmitting a coating material formulation consisting substantially entirely of the saturated, liquid coating composition-rich phase from the vessel to at least one dispenser for deposition on a substrate.

17. The method of claim 16 in which said step of controlling at least one of the pressure and temperature within the vessel comprises varying at least one of the pressure and temperature within the vessel to obtain a predetermined proportion of liquid coating composition and fluid diluent within the liquid coating composition rich phase at the saturation point of the liquid coating composition rich phase.

18. The method of claim 16 in which said step of controlling the at least one of pressure and temperature within the vessel comprises maintaining the vessel at predetermined substantially constant temperature and pressure settings which are above the critical temperature and critical pressure of the fluid diluent.

19. The method of claim 16 in which said step of transmitting a coating material formulation comprises controlling at least one of the temperature and pressure of the liquid coating composition rich phase as it flows between the vessel and at least one dispenser to suppress or encourage the formation of fluid diluent rich phase bubbles within the liquid coating composition rich phase.

20. The method of producing and dispensing a coating material formulation containing a fluid diluent and a liquid coating composition, comprising:
 introducing a fluid diluent into a closed vessel;
 introducing a liquid coating composition into the closed vessel so that fluid diluent is absorbed within the liquid coating composition to produce a liquid coating composition rich phase and a fluid diluent rich phase;
 locating substantially all of the liquid coating composition rich phase in a first area of the closed vessel for transmission as a coating material formulation to at least one dispenser for deposition on a substrate, and locating substantially all of the fluid diluent rich phase in a second area of the closed vessel which is contiguous to the first area;
 controlling the level of liquid coating composition rich phase within the first area so that the liquid coating composition can be sufficiently exposed to fluid diluent in the course of movement through the second area to absorb fluid diluent and produce the liquid coating composition rich phase.

21. The method of claim 20 in which said step of locating the liquid coating composition rich phase comprises allowing the liquid coating composition rich phase to fall under the influence of gravity to the bottom of the vessel.

22. The method of claim 20 in which said step of introducing a liquid coating composition comprises spraying atomized droplets of liquid coating composition from a location near the top of the closed vessel, through said second area and toward the bottom of the closed vessel.

23. The method of claim 20 in which said step of introducing a liquid coating composition comprises directing the liquid coating composition through baffles in the presence of fluid diluent and/or fluid diluent rich phase.

24. The method of claim 20 in which said step of introducing a liquid coating composition into the closed vessel comprises exposing the liquid coating composition to the fluid diluent so that the liquid coating composition becomes substantially saturated with fluid diluent.

25. The method of claim 20 in which said step of exposing a liquid coating composition to a fluid diluent includes maintaining the interior of the closed pressurized vessel at or above the supercritical temperature and the supercritical pressure of the fluid diluent.

26. A method of producing and dispensing a coating material formulation containing a fluid diluent and a liquid coating composition, comprising:
 introducing a liquid coating composition into the interior of a vessel which is at least partially filled with pressurized fluid diluent;
 combining the liquid coating composition and fluid diluent within the vessel interior to form a liquid coating composition rich phase and a fluid diluent rich phase;
 locating substantially all of said liquid coating composition rich phase in one portion of said vessel, and substantially all of said fluid diluent rich phase in another portion of said vessel;
 transmitting a coating material formulation consisting substantially entirely of said liquid coating composition rich phase from said one portion of the vessel to at least one coating dispenser for deposition on a substrate.

27. The method of claim 26 in which said step of combining the liquid coating composition and fluid diluent to form said liquid coating composition rich phase comprises sufficiently exposing the liquid coating composition to the fluid diluent in said vessel to permit saturation or substantial saturation of said liquid coating composition rich phase to occur.

28. The method of claim 27 in which said step of sufficiently exposing the liquid coating composition to the fluid diluent comprises spraying atomized droplets of the liquid coating composition into a portion of the interior of the vessel which contains fluid diluent and/or fluid diluent rich phase so that the liquid coating composition becomes substantially saturated with fluid diluent.

29. The method of claim 27 in which said step of sufficiently exposing the liquid coating composition to the fluid diluent comprises mixing the liquid coating composition with fluid diluent and/or fluid diluent rich phase within a series of baffles.

30. The method of claim 26 further including the step of recirculating through a mixer any portion of said coating material formulation which is not discharged from said coating dispenser, said recirculated coating material formulation being combined in said mixer with liquid coating composition which has not yet been introduced into said vessel, at a location upstream from the vessel.

31. The method of claim 26 further including the step of recirculating into said vessel any portion of said coating material formulation which is not discharged from said coating dispenser, said recirculated coating material formulation being introduced into said vessel in said another portion of said vessel which contains the fluid diluent rich phase.

32. The method of claim 26 in which said step of exposing a liquid coating composition to a fluid diluent includes maintaining the interior of the closed pressurized vessel at or above the supercritical temperature and the supercritical pressure of the fluid diluent.

33. The method of claim 32 further including the step of maintaining the vessel at a predetermined temperature.

34. A method of producing and dispensing a coating material formulation containing a fluid diluent and a liquid coating composition, comprising:

introducing a fluid diluent under pressure into the interior of a vessel;

introducing a liquid coating composition into the vessel for combination with the fluid diluent therein to produce a liquid coating composition rich phase and a fluid diluent rich phase;

controlling the pressure and temperature in the vessel to obtain a desired ratio of fluid diluent and liquid coating composition within the substantially saturated, liquid coating composition rich phase;

transmitting a coating material formulation consisting substantially entirely of said substantially saturated, liquid coating composition rich phase from the vessel to at least one coating dispenser for deposition on a substrate;

detecting the level of said liquid coating composition rich phase within the interior of the vessel; and controlling the flow of liquid coating composition introduced into the vessel interior dependent on the level of said liquid coating composition rich phase detected therein.

35. The method of claim 34 in which said step of controlling the pressure and temperature in the vessel includes maintaining the interior of the vessel at or above the supercritical temperature and the supercritical pressure of the fluid diluent.

36. The method of producing and dispensing at least two coating material formulations each containing a fluid diluent and a liquid coating composition, comprising:

introducing at least two liquid coating compositions of different colors into separate vessels, each of which being at least partially filled with pressurized fluid diluent;

combining one liquid coating composition and the fluid diluent within a first vessel to form a first liquid coating composition rich phase and a first fluid diluent rich phase therein, and combining the other liquid coating composition and the fluid diluent within a second vessel to form a second liquid coating composition rich phase and a second fluid diluent rich phase therein, each of said first and second liquid coating composition rich phases being located in one portion of the interior of their respective vessels and each of said first and second fluid diluent rich phases being located in another portion of the interior of their respective vessels;

directing a first coating material formulation consisting substantially entirely of said first liquid coating composition rich phase from said first vessel to a color change manifold and likewise directing a second coating material formulation consisting substantially entirely of said second liquid coating composition rich phase from said second vessel to said color change manifold; and selecting at said color change, manifold which of said first or second coating material formulations to supply to one or more coating dispensers.

37. The method of claim 36 further including the step of backflushing the color change manifold with at least one of said first and second fluid diluent rich phases to clean the color change manifold.

38. A method of producing and dispensing a coating material formulation containing a fluid diluent and a liquid coating composition, comprising:

introducing a fluid diluent under pressure into the interior of a vessel;

spraying atomized droplets of liquid coating composition from nozzle means into the interior of the vessel for combination with the fluid diluent to form a liquid coating composition rich phase and a fluid diluent rich phase therein;

sensing the reduction of flow of liquid coating composition through said nozzle means into the vessel caused by clogging of said nozzle means, and in response thereto directing pressurized, fluid diluent rich phase out of the vessel in the reverse direction through said nozzle means to clear said nozzle means of the clogged condition;

resuming the normal, unrestricted flow of liquid coating composition through said unclogged nozzle means into the vessel; and transmitting a coating material formulation consisting substantially entirely of said liquid coating composition rich phase from the vessel to at least one coating dispenser for deposition on a substrate.

39. A method of producing and dispensing a coating material formulation containing a fluid diluent and a liquid coating composition, comprising:

(i) introducing a fluid diluent into the interior of a vessel;

(ii) adjusting the temperature and pressure of the interior of the vessel to an initial setting for each;

(iii) introducing a liquid coating composition into the interior of a vessel for combination with the fluid diluent therein to produce a liquid coating composition rich phase and a fluid diluent rich phase;

(iv) transmitting a coating material formulation consisting substantially entirely of said liquid coating composition rich phase from the vessel to at least one coating dispenser for deposition in a spray pattern upon a substrate;

(v) repeating steps (i)–(iv) while changing at least one of the pressure and temperature settings of the vessel;

(iv) observing the temperature and pressure setting of the vessel when an optimum spray pattern is produced, and maintaining said temperature and pressure settings throughout an operating run.

* * * * *